(12) United States Patent
Choi et al.

(10) Patent No.: US 8,041,503 B2
(45) Date of Patent: Oct. 18, 2011

(54) TRAFFIC INFORMATION PROVIDING SYSTEM USING DIGITAL MAP FOR COLLECTING TRAFFIC INFORMATION AND METHOD THEREOF

(75) Inventors: Chan-Young Choi, Seoul (KR); Yeong-Sam Jeong, Seoul (KR)

(73) Assignee: SK Marketing & Company, Co., Ltd, Seoul (KR)

( * ) Notice: Subject to any disclaimer, the term of this patent is extended or adjusted under 35 U.S.C. 154(b) by 154 days.

(21) Appl. No.: 12/093,826

(22) PCT Filed: Nov. 29, 2007

(86) PCT No.: PCT/KR2007/006096
§ 371 (c)(1),
(2), (4) Date: May 15, 2008

(87) PCT Pub. No.: WO2008/066337
PCT Pub. Date: Jun. 5, 2008

(65) Prior Publication Data
US 2010/0179748 A1      Jul. 15, 2010

(30) Foreign Application Priority Data

Nov. 30, 2006   (KR) .......................... 10-2006-0119788

(51) Int. Cl.
*G01G 1/01* (2006.01)
*G08G 1/0968* (2006.01)
(52) U.S. Cl. ........................................ 701/117; 340/992
(58) Field of Classification Search ........................ None
See application file for complete search history.

(56) References Cited

U.S. PATENT DOCUMENTS

| | | | |
|---|---|---|---|
| 6,012,012 A | 1/2000 | Fleck et al. | |
| 6,236,933 B1 * | 5/2001 | Lang | 701/117 |
| 6,333,703 B1 * | 12/2001 | Alewine et al. | 340/995.13 |
| 6,401,027 B1 * | 6/2002 | Xu et al. | 701/117 |
| 6,850,840 B1 | 2/2005 | Willenbrock et al. | |
| 7,197,500 B1 | 3/2007 | Israni et al. | |
| 2007/0294023 A1 * | 12/2007 | Arcot et al. | 701/117 |

FOREIGN PATENT DOCUMENTS

| | | |
|---|---|---|
| EP | 0889454 A2 | 1/1999 |
| JP | 2002-269692 | 9/2002 |

(Continued)

OTHER PUBLICATIONS

International Search Report and Written Opinion dated Mar. 14, 2008. PCT/KR2007/006096. 10 pages.

*Primary Examiner* — Michael J. Zanelli
(74) *Attorney, Agent, or Firm* — Rabin & Berdo, P.C.

(57) ABSTRACT

The present invention relates to a traffic information providing system and method using a traffic information collecting digital map. A traffic information collecting terminal receives GPS data from at least one GPS satellite, and generates traffic information target location information with reference to traffic information established based on the GPS data. The traffic information target location information includes a coordinate and a time and can further include a type or an order on the traffic information target location information. The traffic information providing system matches traffic information target location information provided by the terminals on nodes and links for collecting traffic information of a traffic information collecting digital map, generates section communication information for a section, processes the section communication information, and provides it as traffic information. Therefore, accurate communication information is generated and more accurate traffic information is provided. For example, it is possible to generate accurate traffic information excluding a traveling time (or a traveling speed) error caused by a probe vehicle's entrance to a rest area from the link having an expressway rest area.

14 Claims, 14 Drawing Sheets

FOREIGN PATENT DOCUMENTS

| | | |
|---|---|---|
| JP | 2002-342879 A | 11/2002 |
| JP | 2004-078614 | 3/2004 |
| KR | 1020020042889 | 6/2002 |
| KR | 1020040023902 | 3/2004 |
| KR | 1020040105025 | 12/2004 |
| KR | 1020050111238 | 11/2005 |

* cited by examiner

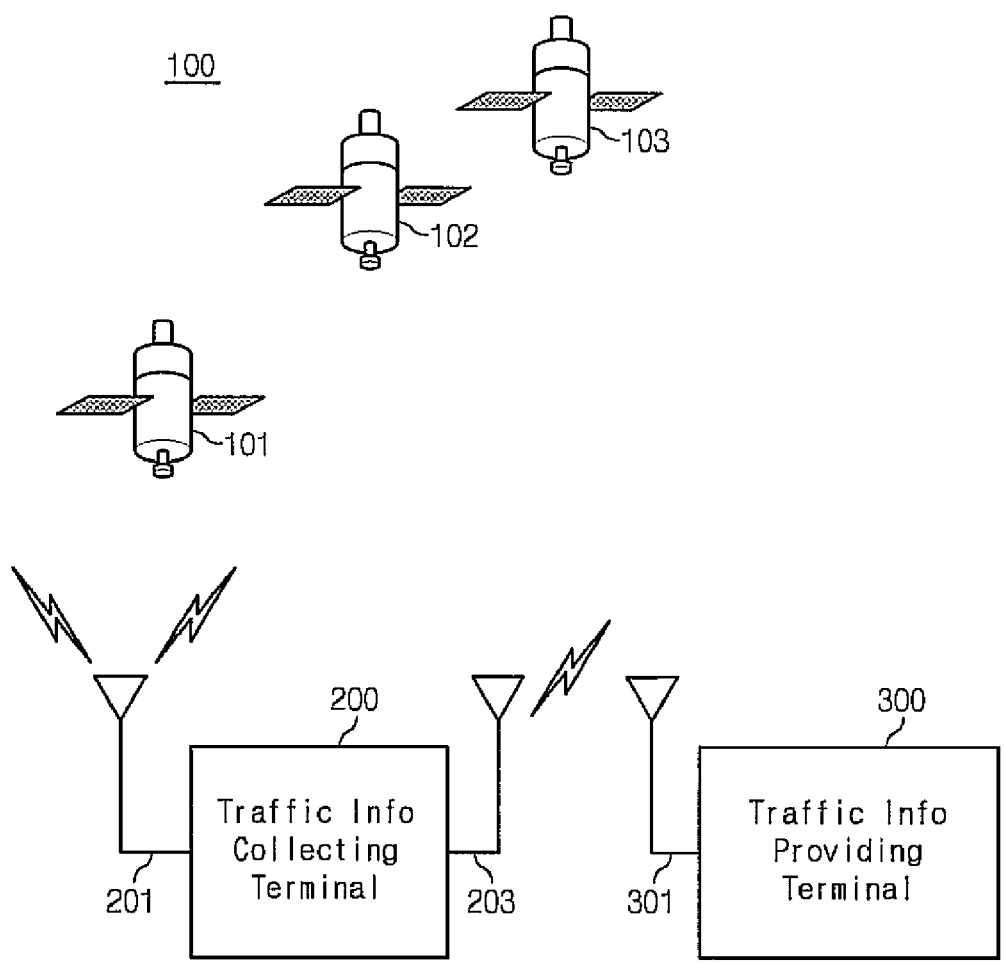

[FIG. 2]
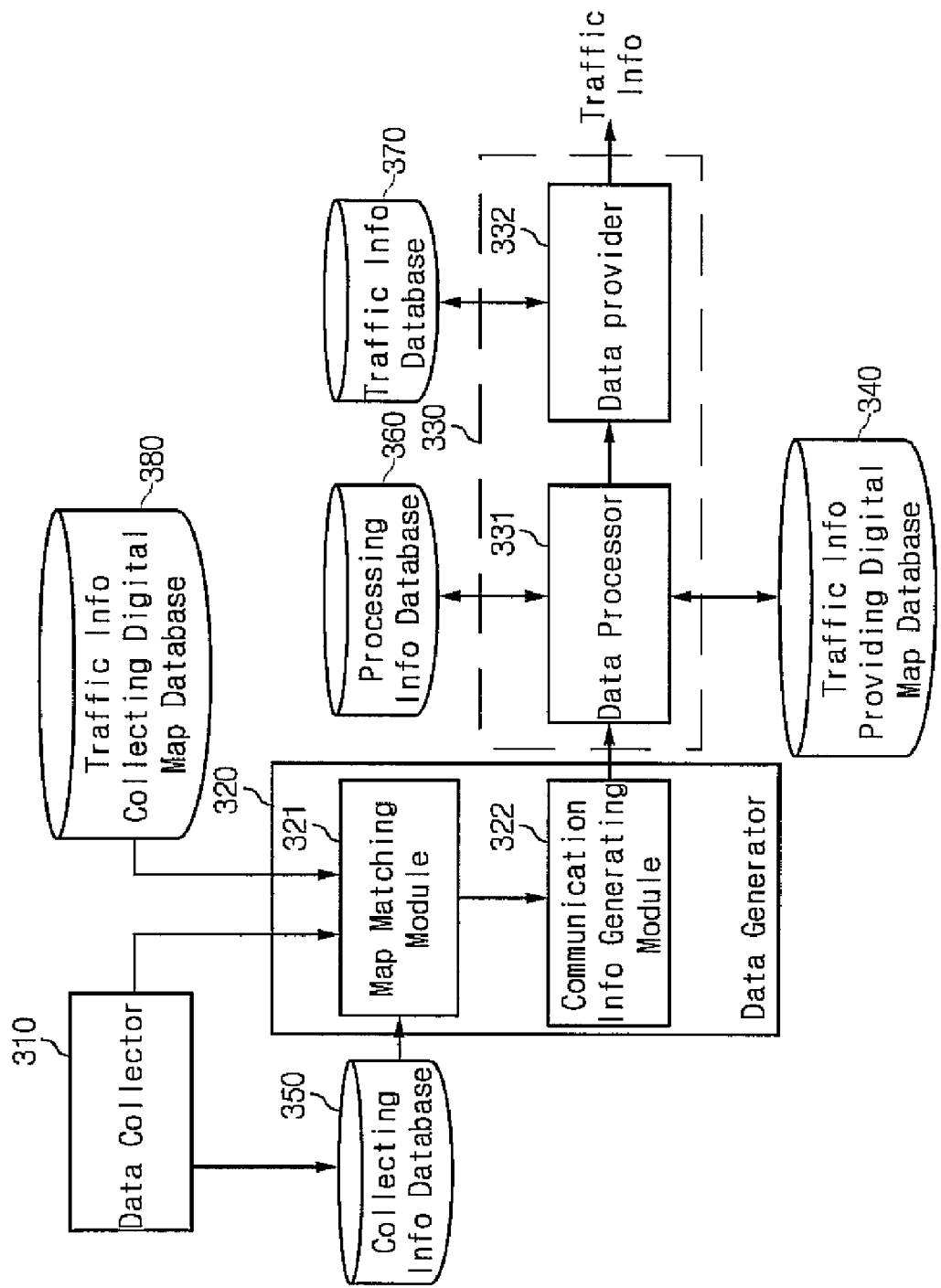

[FIG. 3]
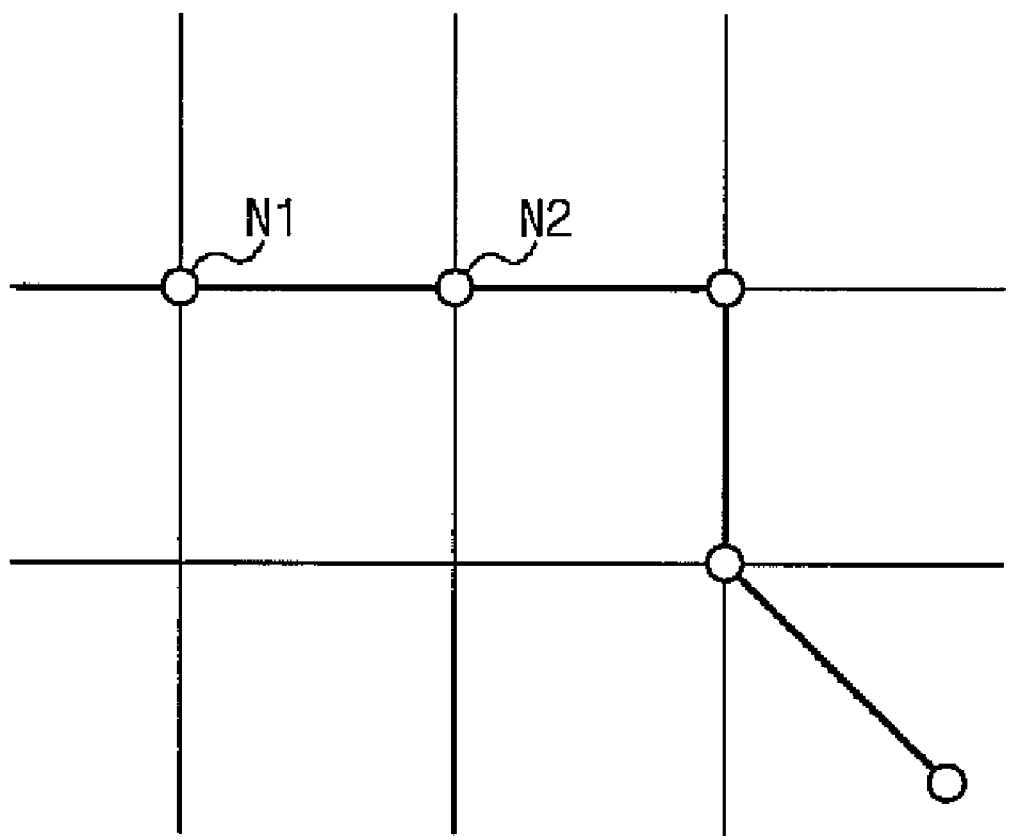

[FIG. 4]
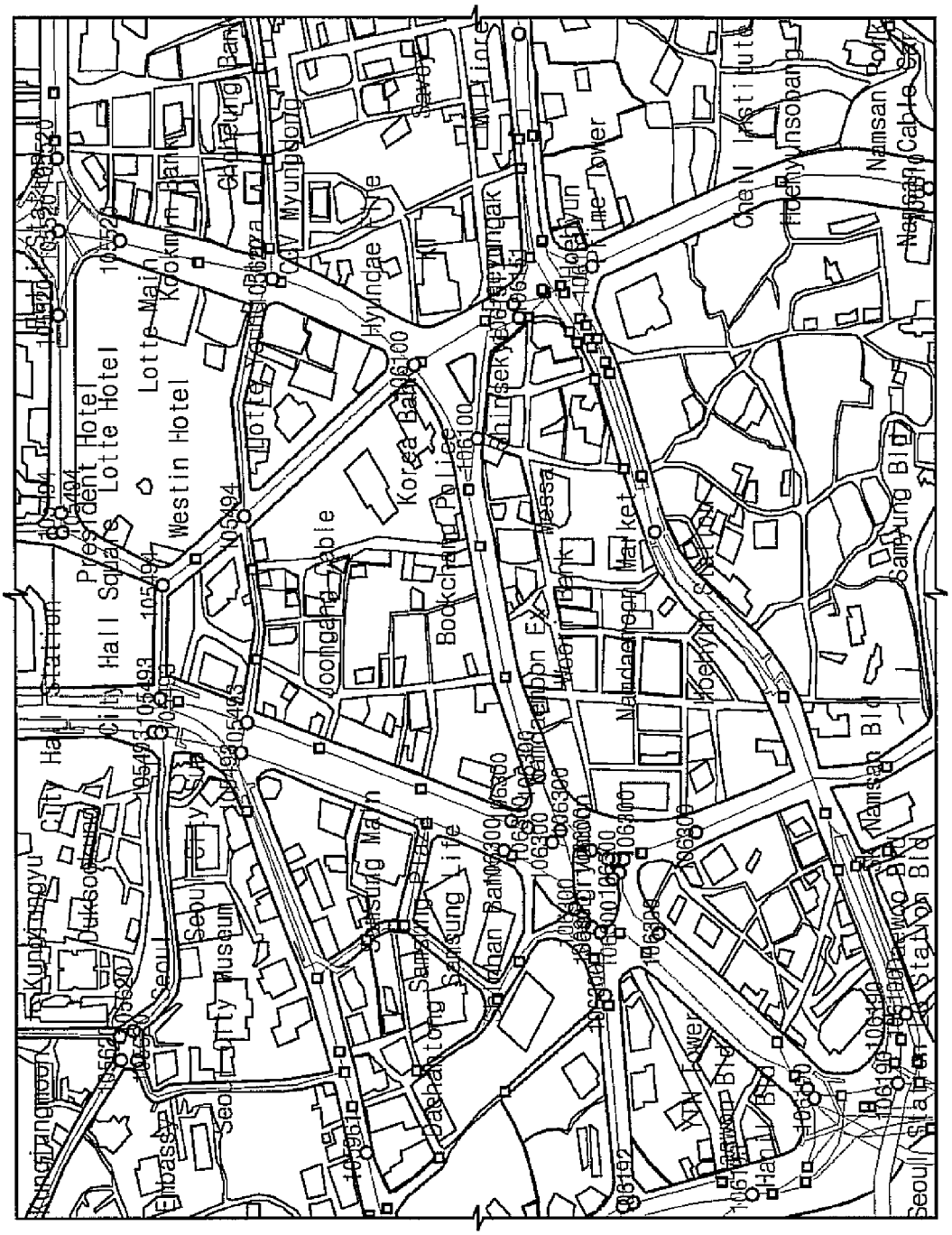

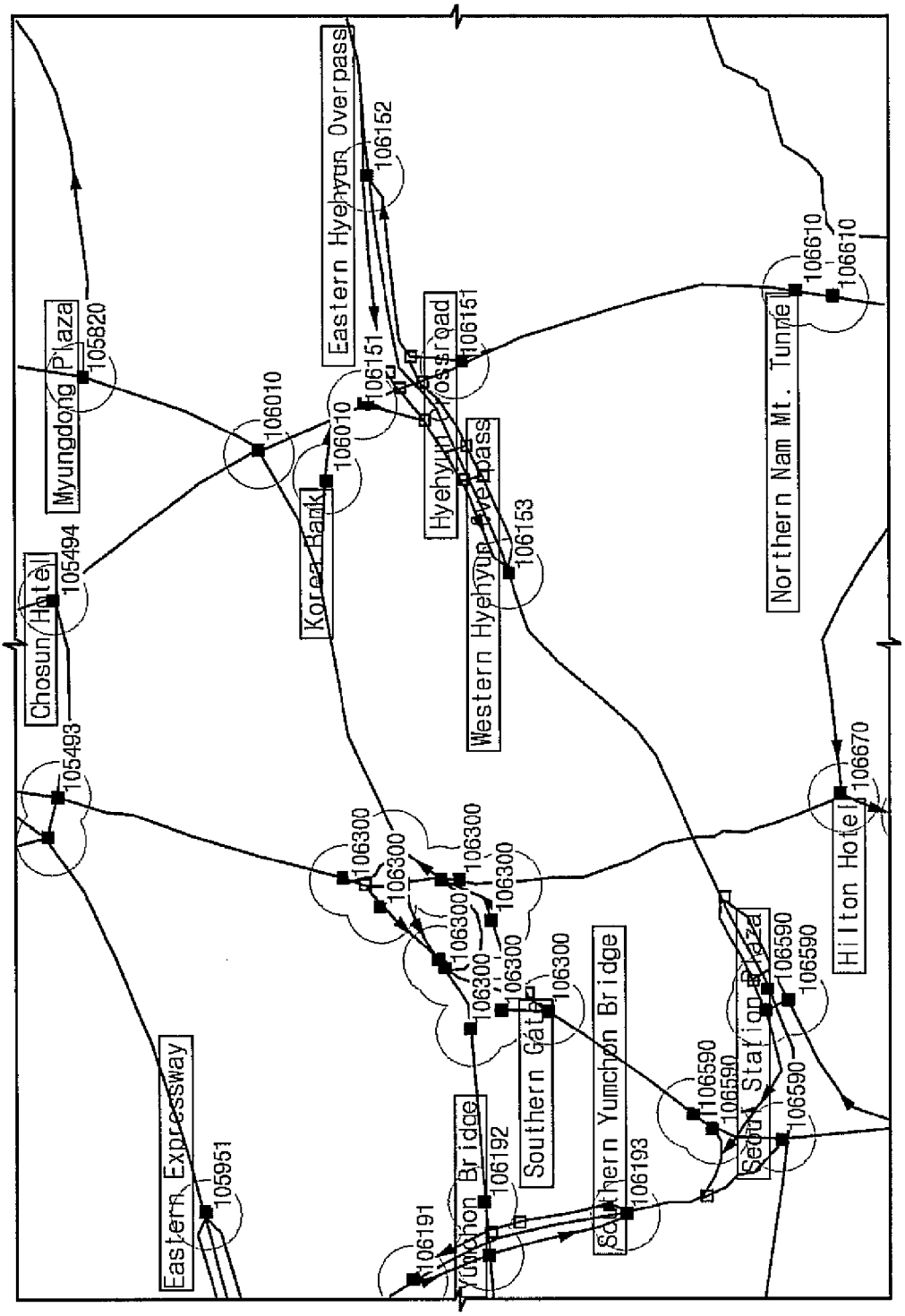
[FIG. 5]

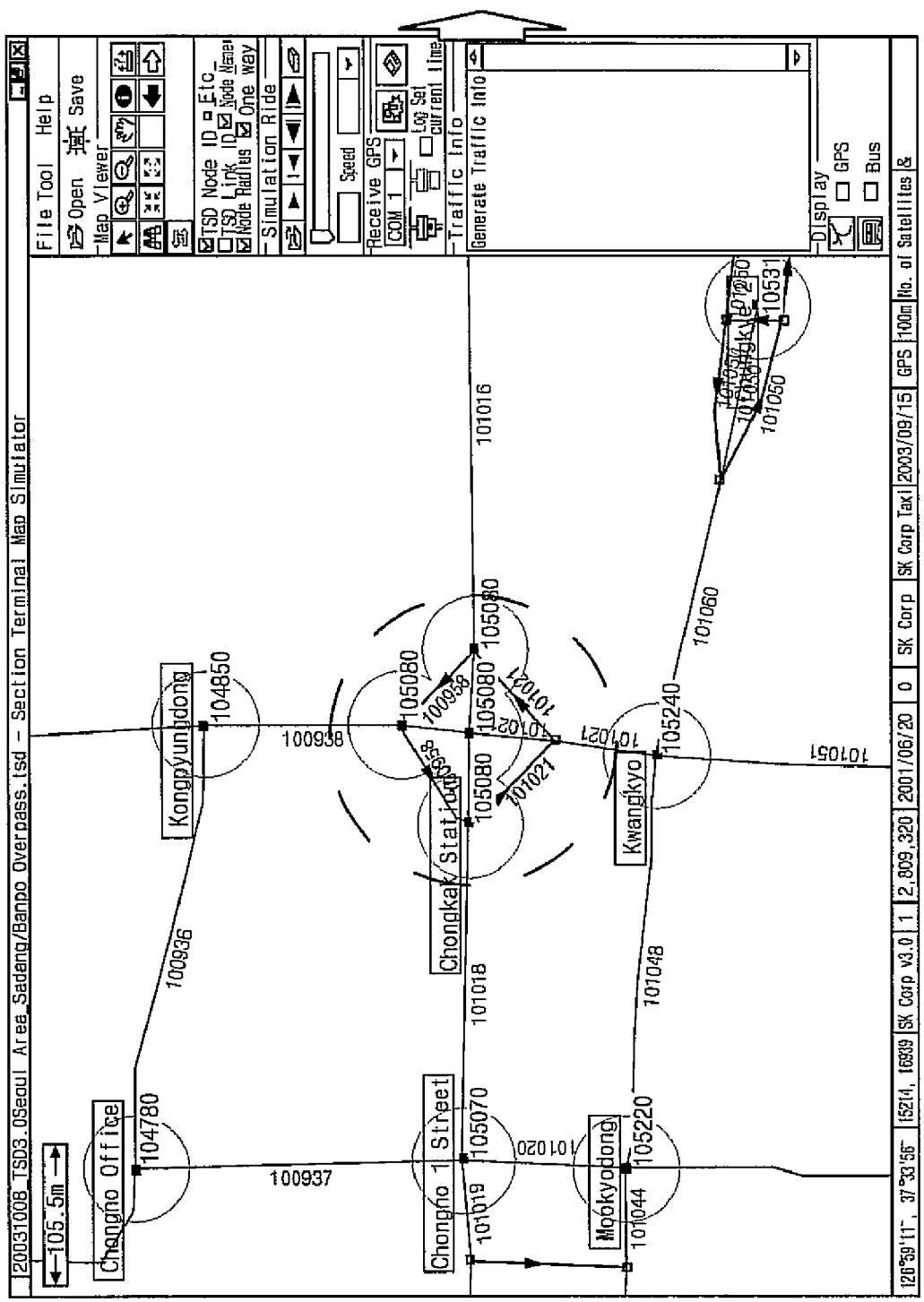
[FIG. 6A]

[FIG. 6B]
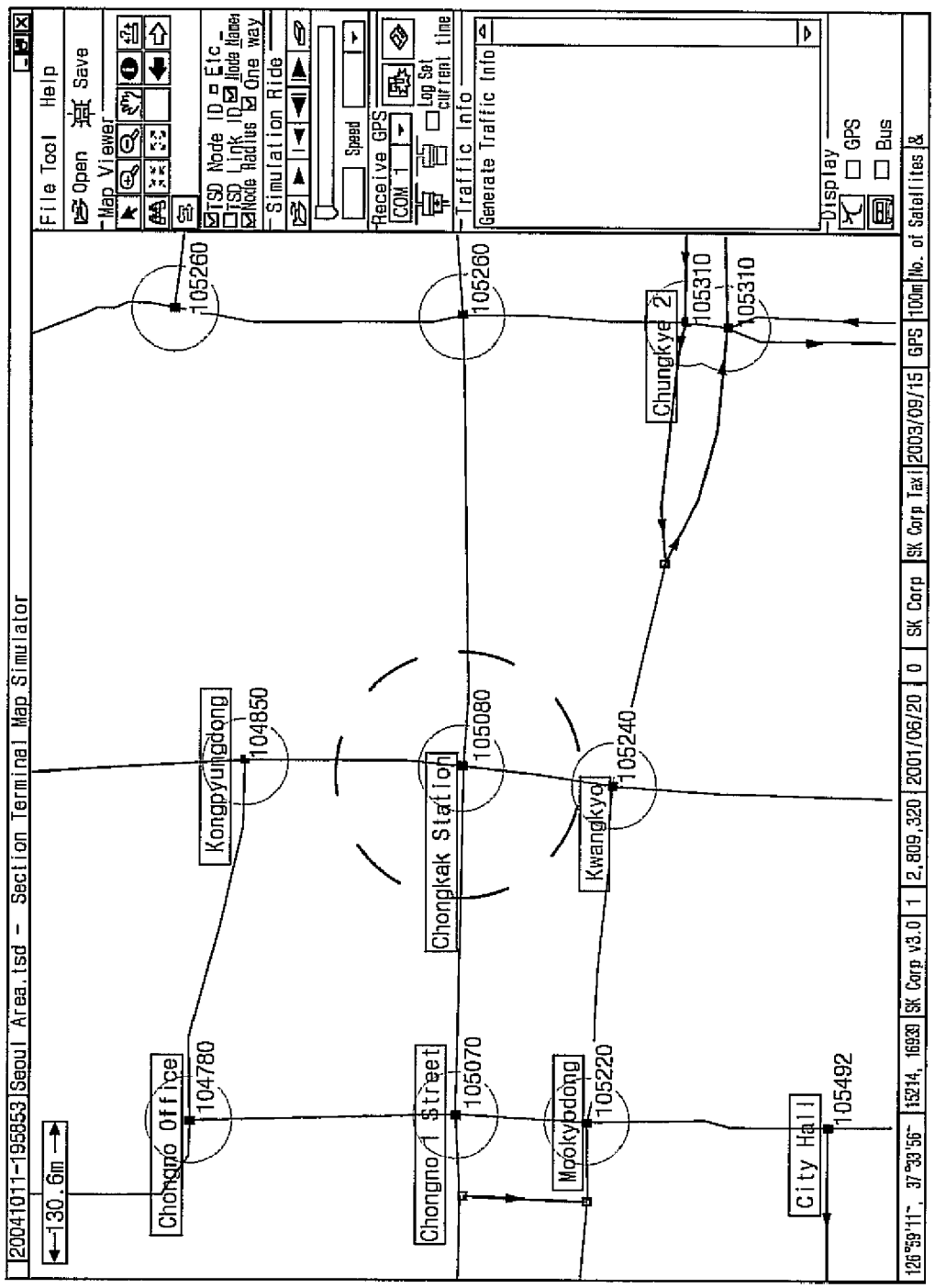

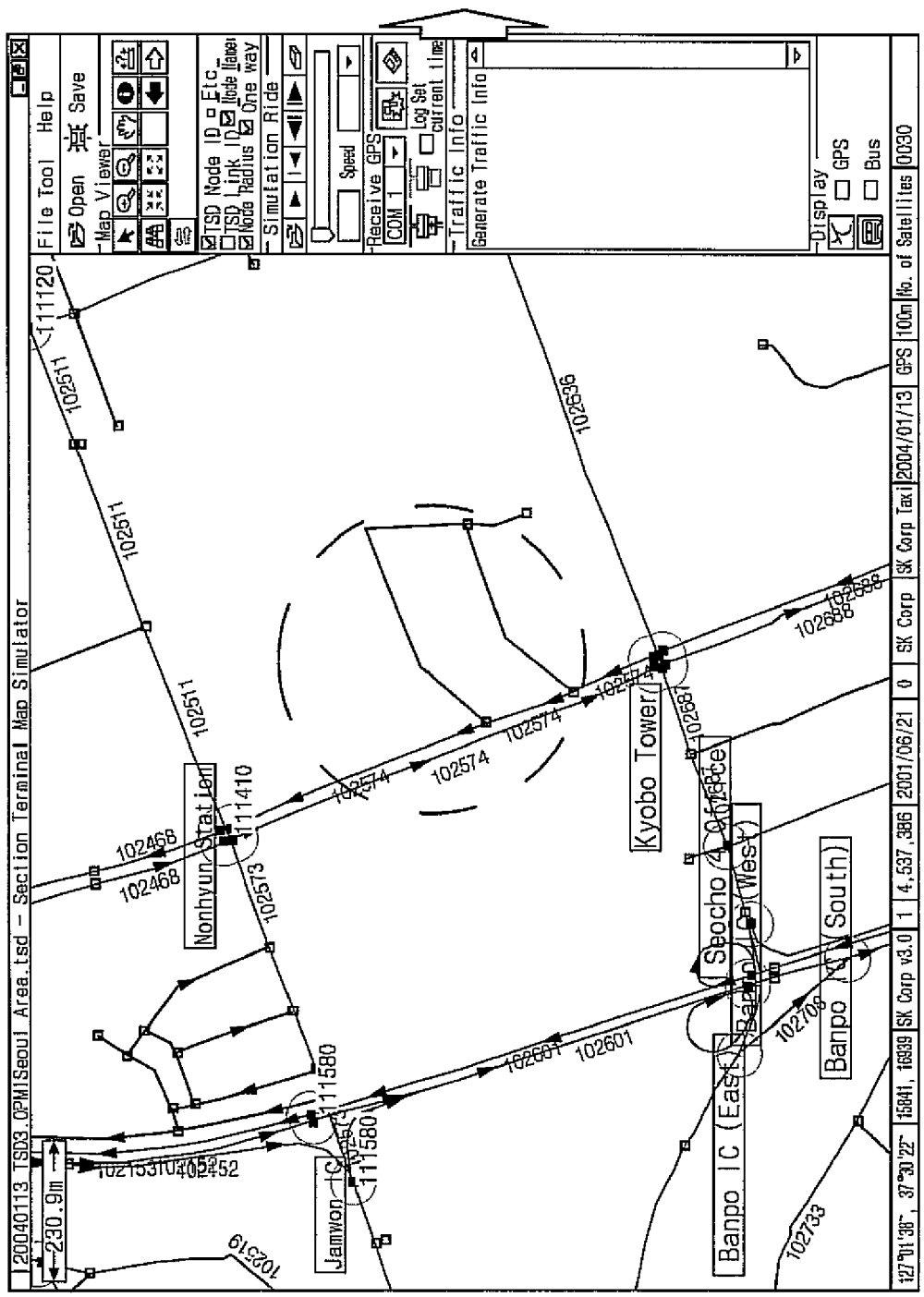
[FIG. 7A]

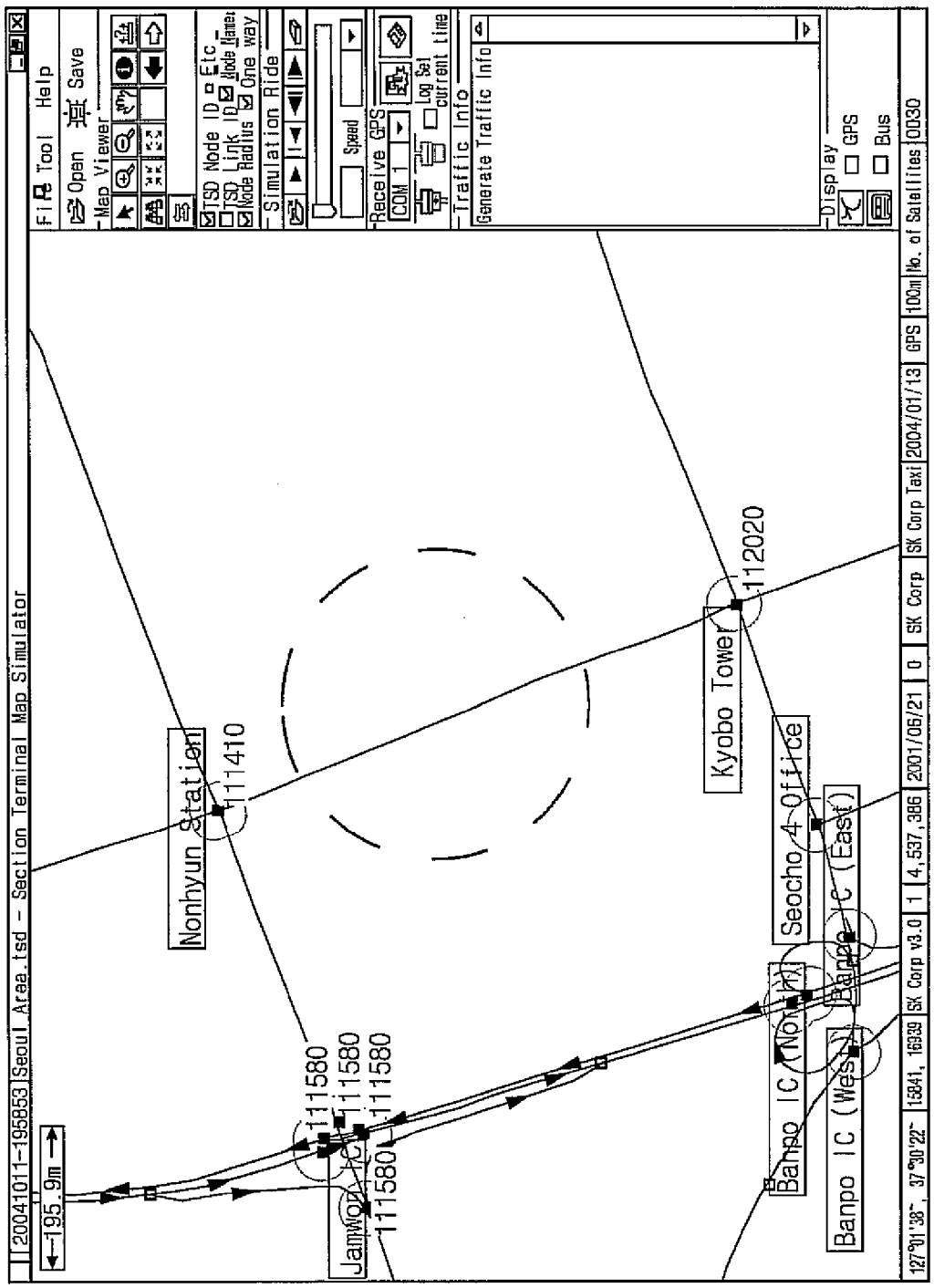
[FIG. 7B]

[FIG. 8A]
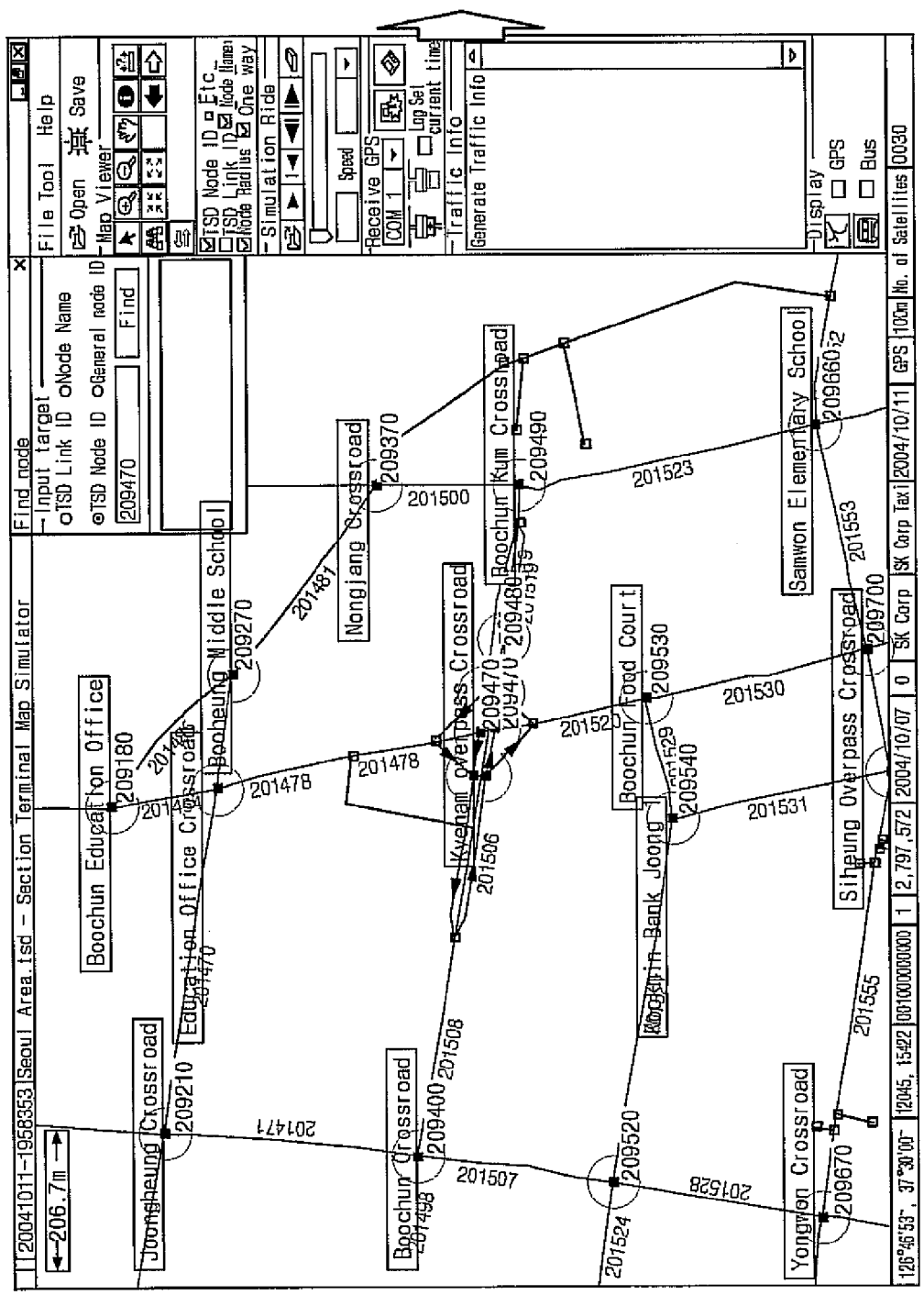

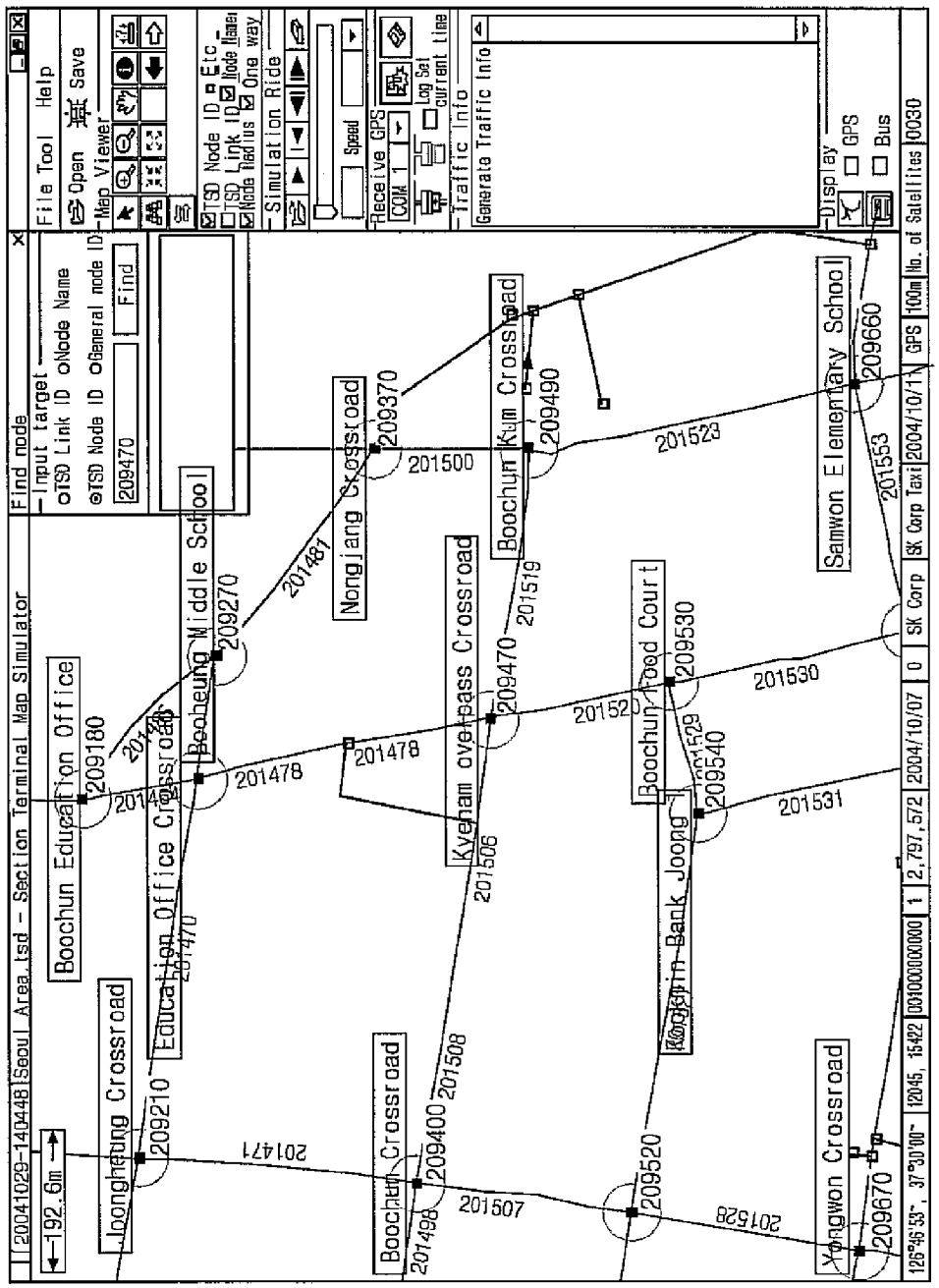
[FIG. 8B]

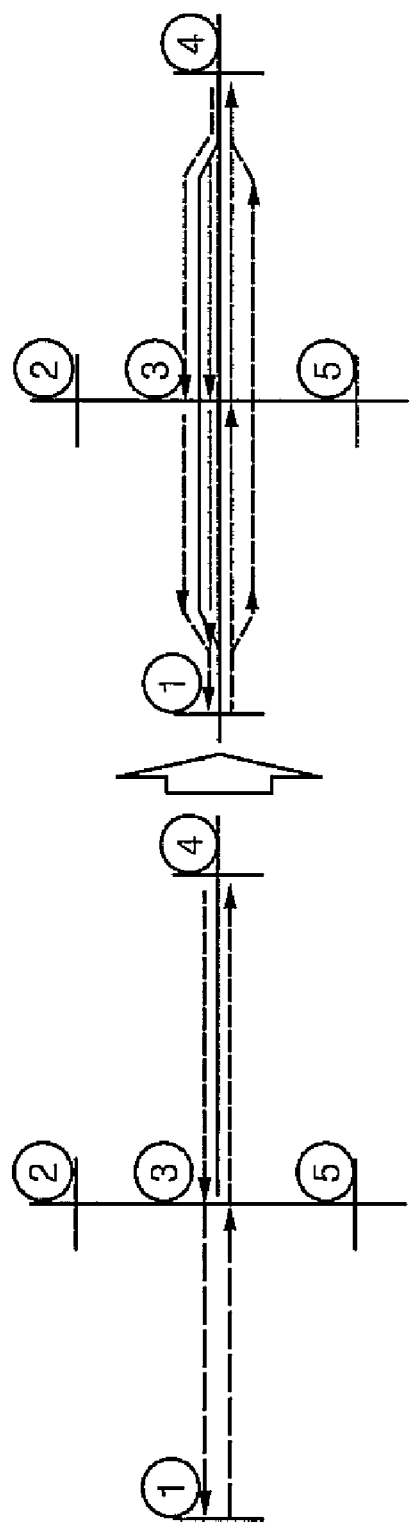
[FIG. 9]

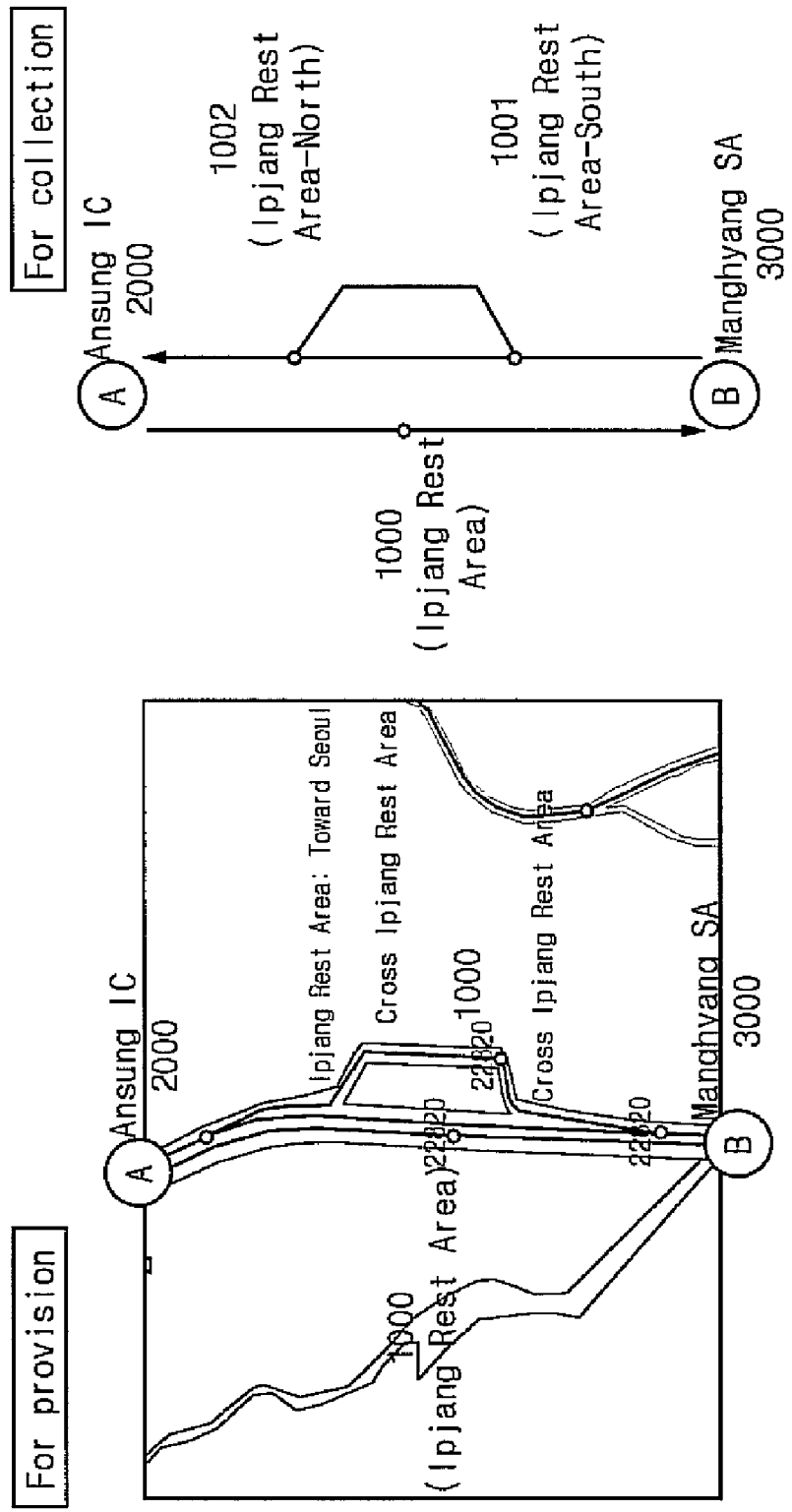
[FIG. 10]

[FIG. 11]
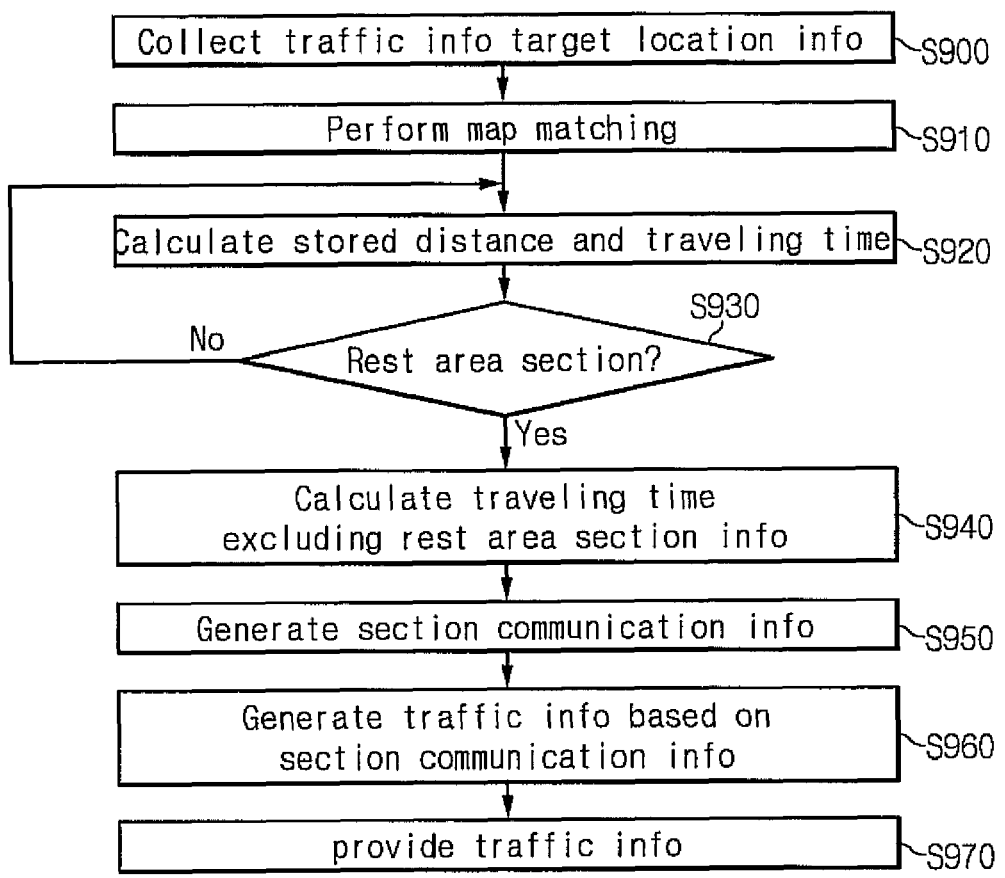

TRAFFIC INFORMATION PROVIDING SYSTEM USING DIGITAL MAP FOR COLLECTING TRAFFIC INFORMATION AND METHOD THEREOF

CROSS-REFERENCE TO RELATED APPLICATIONS

This application is the U.S. national phase of PCT/KR2007/006096 filed Nov. 29, 2007, which claims priority of Korean Patent Application KR 10-2006-0119788 filed Nov. 30, 2006.

BACKGROUND OF THE INVENTION (a) Field of the Invention

The present invention relates to a traffic information providing system. More particularly, the present invention relates to a traffic information providing system using a digital map and a method thereof.

(b) Description of the Related Art

Recently, techniques for minimizing operation and time costs by providing real-time section traffic information to road users, and increasing road efficiency by decentralizing traffic amounts on limited roads and scattering vehicles have been developed.

The traffic information is processed and generated from collection information provided by a plurality of probe vehicles.

However, no exclusive digital map for collecting traffic information has been provided. Therefore, information collected by the probe vehicles has been matched with a general digital map for providing traffic information to generate traffic information, and then the generated traffic information has been provided to users.

In the prior art, traffic information generating efficiency has been substantially deteriorated during the process for generating the traffic information by matching GPS tracking information transmitted to a center from a traffic information collecting terminal and the general digital map by using a link matching algorithm. Particularly, traffic information on important crossroads, overpass/underground roadway sections, and main stream dividing sections (e.g., expressways) is inaccurate.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a traffic information providing system and method having advantages of generating more accurate traffic information by solving the drawbacks of general digital maps.

In one aspect of the present invention, a system for generating and providing traffic information on a predetermined section though communication with a terminal installed in a traveling object includes: a traffic information collecting digital map database for storing a traffic information collecting digital map that is generated to maintain the distance between detection nodes to be greater than a predetermined distance by considering an error range of a GPS sensor of the traveling object; a data collector for receiving traffic information target location information from the terminal, the traffic information target location information including at least one of a coordinate, a time, a node type, and an order of the detection nodes; a data generator for matching the traffic information target location information on the traffic information collecting digital map, and generating communication information on a predetermined section with reference to a unit node based on the map matching result; a traffic information providing digital map database for storing a digital map for providing traffic information; and a traffic information provider for generating traffic information by mapping the communication information on the traffic information providing digital map, and providing the traffic information.

In another aspect of the present invention, a method for providing traffic information by a system for generating and providing traffic information on a predetermined section though communication with a terminal installed in a traveling object includes: a) the system receiving traffic information target location information from the terminal, the traffic information target location information including at least one of a coordinate, a time, a node type, and an order of nodes; b) the system matching the traffic information target location information on unit node map information of the traffic information collecting digital map; c) generating communication information on a predetermined section with reference to a unit node based on the map matching result; and d) the system generating traffic information by mapping the communication information on the traffic information providing digital map, and providing the traffic information.

BRIEF DESCRIPTION OF THE DRAWINGS

FIG. 1 is a schematic view for providing traffic information according to an exemplary embodiment of the present invention.

FIG. 2 is a schematic diagram for a traffic information providing system according to an exemplary embodiment of the present invention.

FIG. 3 is an example for matching traffic information target location information and unit node map information.

FIG. 4 is an example of a digital map for providing traffic information.

FIG. 5 is an example of a digital map for collecting traffic information.

FIG. 6A and FIG. 6B show nodes of a traffic information providing digital map and a traffic information collecting digital map on the crossroads.

FIG. 7A and FIG. 7B show nodes between a traffic information providing digital map and a traffic information collecting digital map in a double-tracked section.

FIG. 8A, FIG. 8B, and FIG. 9 show nodes between a traffic information providing digital map and a traffic information collecting digital map on an overpass/underground roadway.

FIG. 10 shows nodes between a traffic information providing digital map and a traffic information collecting digital map in a rest area on the expressway.

FIG. 11 is a flowchart for a traffic information providing method according to an exemplary embodiment of the present invention.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising", and variations such as "comprises", will be understood to imply the inclusion of stated elements but not the exclusion of any other elements. Also, the term of a module in the present specification represents a unit for processing a predetermined function or operation, which can be realized by hardware, software, or a combination of hardware and software.

In an exemplary embodiment of the present invention, traffic information is generated and provided based on the GPS method, and particularly, the traffic information is generated based on traffic information target location information. Here, traffic information target location information is basic information for generating the traffic information, and is measured by a traffic information collecting terminal and is then provided to a system. The traffic information target location information is GPS data that is acquired from among GPS data according to the GPS method with reference to the traffic information generating point. In detail, the traffic information target location information includes at least one of GPS data on the established traffic information generating point, GPS data of an established location corresponding to the established distance from the traffic information generating point, and GPS data corresponding to the established area having a predetermined radius with reference to the traffic information generating point or the predetermined location. Particularly, the GPS data corresponding to the established area from among the traffic information target location information can be GPS data when a traveling body enters the established area, passes through the middle of the established area, or just leaves the established area.

FIG. 1 shows a traffic information generating system using GPS according to an exemplary embodiment of the present invention. As shown in FIG. 1, a traffic information collecting terminal 200 generates traffic information target location information based on data transmitted by GPS satellites 101, 102, and 103 and transmits the same to a traffic information providing system 300. The traffic information providing system 300 generates traffic information on a predetermined section based on the traffic information target location information transmitted by the terminal 200. Here, the GPS satellites 101, 102, and 103 measure the locations of all traveling objects on Earth by calculating the distance and distance variation speed, and the traffic information collecting terminal 200 receive GPS data from at least 3 GPS satellites 101, 102, and 103 and measures the current location of the vehicle based on the GPS data provided to the traveling object such as a probe vehicle. Here, the terminal 200 is exemplarily installed in the vehicle, but the installation of the terminal is not restricted to the vehicle. A GPS antenna 201 for receiving radio waves from the GPS satellites 101, 102, and 103 is connected to the traffic information collecting terminal 200. The traffic information collecting terminal 200 generates and provides traffic information target location information based on the GPS data provided by the GPS satellites at time intervals (e.g., 1 second). The traffic information providing system 300 collects and processes the traffic information target location information transmitted by the traffic information collecting terminal 200 of the traveling object, and generates communication information for each section on the roads. Particularly, the traffic information providing system 300 generates the per-section traffic information by mapping the collected location information on the stored electronic map.

Next, a configuration of the traffic information providing system 300 for collecting the traffic information target location information from the terminals and providing traffic information based on the collected location information.

FIG. 2 is a structure for a traffic information providing system according to an exemplary embodiment of the present invention.

Referring to FIG. 2, the traffic information providing system 300 includes a traffic information collecting digital map database 380, a traffic information providing digital map database 340, a data collector 310, a data generator 320, and a traffic information provider 330. The traffic information providing system 300 further includes an information database 350 for storing traffic information target location information, a processing information database 360 for storing per-section communication information, and a traffic information database 370 for storing processed traffic information.

The data collector 310 collects and processes traffic information target location information provided by the terminals 200. For example, the data collector 310 eliminates errors that are generated from the collected traffic information target location information because of a communication problem or a driver's abnormal driving.

The data generator 320 maps the collected location information on the digital electronic map of the traffic information collecting digital map database 380 to generate source data. For this purpose, the data generator 320 stores traffic information collecting digital map including nodes and links of traffic information collecting units, matches the collected traffic information target location information on the digital map, and generates per-section communication information. Here, the generated per-section communication information are unprocessed source data, and the source data are processed to be data that can be processed by the data processor 331 of the traffic information provider 330.

For this purpose, the data generator 320 includes a map matching module 321 and a communication information generating module 322, and the source data, that is per-section communication information, generated by the data generator 320 are stored in the processing information database 360.

The traffic information collecting digital map database 380 stores unit node map information for matching the unit node and the link for collecting communication information so that a predetermined section that normally easily generates an error may generate less errors from among the map data including a plurality of map nodes and a plurality of map links for connecting the map nodes.

The map matching module 321 matches the location information provided by the data collector and the unit node map information of the traffic information collecting digital map database 380. The communication information generating module 325 determines whether the traveling object has passed a predetermined section between the unit nodes according to map matching information, and calculates the passing speed by using the time and the distance generated by the passing of the section when the traveling object has passed it. For example, when the map matching is performed as shown in FIG. 3, a passing time is calculated based on the distance (included in the unit node map information) between a start node N1 and an end node N2 of a predetermined section and the difference between the time having passed the start node N1 and the time having passed the end node N2, and the passing speed of the section is calculated based on the distance and the passing time. Here, the times having passed the respective nodes are known from the traffic information target location information collected from the terminal. The calculated section passing speed is communication information of the corresponding section, and the per-section communication information is stored in the processing information database 360. The data processor 331 processes the source data, that is, per-section communication information to be predetermined data. For example, the data processor 331 filters the source data that are inappropriate for processing information, and generates a link with a 5-minute period and per-rotation communication information based on the filtered source data. The data processor 331 supplements the 5-minute communication information based on the correction value determined according to a predetermined rule, and provides pattern information to the section that lacks data. The data processor 331 matches the processed data and the traffic information providing digital map to convert them into a predetermined format and outputs it as traffic information. The data provider 332 provides the processed traffic information to the users, and stores the provided traffic information in the traffic information database 370. Here, for better comprehension and ease of description, the elements of the system 300 are classified according to functions, and can be classified in different manners based on the functions.

A traffic information collecting digital map according to an exemplary embodiment of the present invention will now be described.

FIG. 4 is an example of a general digital map for providing traffic information.

Referring to FIG. 4, the traffic information providing digital map is called a general base map, and includes linear network data and background data. The above-noted map reflects the linearity of real roads, is generated according to the general network mapping rule for the linearity of overpass/underground roadway sections, expressway sections, and crossroads sections, and is commonly used by most countries.

FIG. 5 is an example of a digital map for collecting traffic information.

Referring to FIG. 5, the traffic information collecting digital map is specified for collecting GPS-based traffic information, differing from the base map that reflects real road linearity, and includes nodes and links shown in FIG. 3.

In order to maximize the traffic information collecting efficiency, the digital map according to the exemplary embodiment of the present invention tunes the existing road linearity to convert it into a traffic information collecting map so as to satisfy the GPS section detecting method in the existing base map.

FIG. 6A and FIG. 6B are part of the traffic information collecting digital map according to the exemplary embodiment of the present invention, showing deletion of links and rotary links on the crossroads.

Referring to FIG. 6A, the traffic information providing digital map has a corresponding node at each entrance of the real crossroads so that the calculation of the corresponding section length generates an error and accurate communication information is not generated, but referring to FIG. 6B, the traffic information collecting digital map according to the exemplary embodiment of the present invention has a node in the center of the crossroads so that the length between the nodes is the length of the real section. Therefore, more accurate communication information is generated.

FIG. 7A and FIG. 7B are part of the traffic information collecting digital map according to an exemplary embodiment of the present invention, eliminating unnecessary linearity and simplifying doubled roads.

Referring to FIG. 7A, the traffic information providing digital map has expressways or general roads and neighboring general roads or expressways, and when the traffic information target location information is mapped on the traffic information providing digital map, the corresponding vehicle can be measured as alternately traveling the general road and the expressway because of the error of the GPS data.

Accordingly, referring to FIG. 7B in the traffic information collecting digital map according to the exemplary embodiment of the present invention, the links are unified into a single link, a node is generated at a predetermined distance from the entrance and the exit on the combined part of the general road, and the traveling section of the real vehicle is detected to generate accurate section communication information on the road.

FIG. 8A and FIG. 8B are part of the traffic information collecting digital map according to the exemplary embodiment of the present invention, showing simplified overpass/underground roadway sections.

Referring to FIG. 8A, since the overpass/underground roadway and general roads are displayed in the traffic information providing digital map, when the traffic information target location information is mapped on the traffic information providing digital map conventionally, the corresponding vehicle can be measured to alternately travel on the underground roadway and the general road because of the error of the GPS data.

Accordingly, referring to FIG. 8B, in the traffic information collecting digital map, the overpass/underground roadways are made into a single line, and a node for determining going straight, turning left, and turning right is generated.

The mapping process from the traffic information collecting digital map to the traffic information providing map for providing traffic information is performed in the reverse order, and a conversion mapping table is stored in advance in the traffic information providing digital map database 340.

FIG. 9 shows a process for converting the traffic information collecting digital map of FIG. 8A and FIG. 8B into the original traffic information providing digital map.

Referring to FIG. 9, the links are generated by referring to the conversion table stored in advance in the traffic information providing digital map database 340, and the links are converted into information for the real map. Here, the traffic information providing digital map corresponds to the map viewed by the user, and is applied when it is displayed on the user terminal.

FIG. 10 is part of the traffic information collecting digital map according to the exemplary embodiment of the present invention, showing a rest area on the expressway.

Referring to FIG. 10, when a rest area section is provided in the expressway section, that is, when traffic information from the section of Manghyang rest area→Ipjang rest area→Ansung IC to the section of Manghyang rest area→Ipjang rest area and traffic information of Ipjang rest area→Ansung IC are generated, traffic information for the 2 sections can be different from the real section traffic information depending on the passing through of the rest area.

Therefore, the traffic information collecting digital map according to the embodiment of the present invention removes the influence of the rest area by distinguishing the upward rest area node. That is, section traffic information of the sections 1001→1002 configured by the rest area nodes is not generated. Therefore, the rest area section is omitted and the traffic information is generated when the traffic information of the section of Manghyang rest area→Ipjang rest area→Ansung IC is generated. In this case, the distance occupied by the rest area section in the entire measurement section is short, and the measurement of the communication information is not influenced.

A method for providing traffic information according to an exemplary embodiment of the present invention will be described.

FIG. 11 is a flowchart of a traffic information providing method according to an exemplary embodiment of the present invention.

Referring to FIG. 11, on receiving traffic information target location information from the traffic information collecting terminal 200, the data collector 310 of the system 300 converts location information into a predetermined format and transmits the format to the data generator 320 (S900).

The data generator 320 searches the mapping point that corresponds to location information from the unit node map information in the traffic information collecting digital map, matches the received traffic information target location information and the searched matching point, and transmits the corresponding map matching result to the communication information generating module 322 (S910).

Here, the data generator 320 loads unit node map information if needed, searches the map matching point for the entire links of the map information in the initial case of a node search for map matching based on the location information, and searches the matching point for the connection links caused by the existing map matching in other cases. In this instance, the searches matching point can be selectively validated.

The communication information generating module 322 determines whether the traveling object has passed through a predetermined section between unit nodes according to map matching information, and calculates the section passing time and the distance when it has passed the section (S920).

The communication information generating module 322 determines whether the calculated distance and traveling time information has an expressway rest area section (S930).

When it has an expressway rest area section, the communication information generating module 322 discards the calculated distance and the traveling time information corresponding to the section (S940).

The communication information generating module 322 generates section communication information including a traveling speed by using the calculated distance and the traveling time, and stores the generated communication information in the processing information database 360 (S950).

The data processor 331 generates traffic information by mapping the generated per-section communication information on the traffic information providing digital map (S960), and the data provider 332 provides the generated traffic information to the users (S970).

According to the exemplary embodiment, the systems collect location information in consideration of the error of GPS reception, and generate and provide traffic information based on the location information, thereby generating more accurate traffic information. Also, when the path guidance is performed based on a center communication type mobile phone, information (traffic target location information) for generating the traffic information on the path traveled by the vehicle having a corresponding mobile phone can be provided together with real-time path guidance. Hence, quality traffic information can be generated without additional cost as the number of vehicles is increased, and the range for generating traffic information is increased.

Further, traffic information collection efficiency on a large amount of GPS tracking information collected to the center is maximized to generate efficient traffic information on all the roads on which the vehicle having a GPS-based road/traffic information provider and a vehicle navigator traveled, and hence, the cost for building an additional infrastructure and the maintenance fee can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. For example, in the case of generating the location data of the traveling object for the respective locations by using a method other than the GPS method, it is possible to generate traffic information target location information based on the location data and to provide traffic information based on the generated information.

The above-described embodiments can be realized through a program for realizing functions corresponding to the configuration of the embodiments or a recording medium for recording the program in addition to through the above-described device and/or method, which is easily realized by a person skilled in the art.

Therefore, in the exemplary embodiment, the search speed is improved and the most accurate and optimized path can be provided since the ideal value used for the area restriction method is applied as a real value to acquire the accurate time for reaching the destination and search the path in consideration of the optimized links.

What is claimed is:

1. A system for generating and providing traffic information on a predetermined section though communication with a terminal installed in a traveling object, the system comprising:
   a traffic information collecting digital map database for storing a traffic information collecting digital map that is generated to maintain the distance between detection nodes to be greater than a predetermined distance by considering an error range of a GPS sensor of the traveling object;
   a data collector for receiving traffic information target location information from the terminal, the traffic information target location information including at least one of a coordinate, a time, a node type, and an order of the nodes;
   a data generator for matching the traffic information target location information on the traffic information collecting digital map, and generating communication information on a predetermined section with reference to a unit node based on the map matching result;
   a traffic information providing digital map database for storing a digital map for providing traffic information; and
   a traffic information provider for generating traffic information by mapping the communication information on the traffic information providing digital map, and providing the traffic information.

2. The system of claim 1, wherein
   the data generator determines whether a traveling object has passed through a predetermined section between unit nodes according to the map matching information, and generates section communication information including a traveling speed by using a distance and a traveling time that is generated while the traveling object passes through the section when the traveling object is found to have passed through the section.

3. The system of claim 2, wherein
   the predetermined section includes an expressway section in which a rest area section is provided, the data generator generates the section communication information excluding a traveling time spent for the traveling object to pass through the rest area section and a length of the rest area section.

4. The system of claim 1, wherein the data generator includes:
a map matching module for mapping location information provided by the data collector on unit node map information of a traffic information collecting digital map database; and
a communication information generating module for determining whether the traveling object has passed through a predetermined section between unit nodes according to the map matching information, calculating a passing speed by using the time and distance for passing through the section when the traveling object has passed through the section, and generating communication information including the passing speed,
wherein the predetermined section includes an expressway section in which a rest area section is provided, and the communication information generating module generates the communication information excluding a traveling time spent for the traveling object to pass through the rest area section and a length of the rest area section.

5. The system of claim 1, wherein
the traffic information collecting digital map includes crossroads, and
the traffic information collecting digital map database installs a central node in the center of the crossroads, and the data generator generates communication information by using the traveling time between the central node of the crossroads and a different unit node and the distance between the central node and the different unit node.

6. The system of claim 1, wherein
the traffic information collecting digital map includes a road and a neighboring road, and
the traffic information collecting digital map database generates a single lined road in which the road and a part of the neighboring road are combined together and installs a node at an entrance of the combined part of the neighboring road and a node at an exit of the combined part of the neighboring road, and the data generator generates communication information by determining passing through of a corresponding path according to the passing state of the node at the entrance and the node at the exit.

7. The system of claim 1, wherein
the traffic information collecting digital map includes a general road and an adjacent overpass or underground roadway, and
the traffic information collecting digital map database generates a single line to indicate the general road and the adjacent overpass or underground roadway, and installs a node on the single line at a position corresponding to an entrance of the adjacent overpass or underground roadway.

8. The system of claim 1, wherein the system further includes:
a collecting information database for storing collected location information;
a processing information database for storing communication information on the section; and
a traffic information database for storing the traffic information, and wherein
the traffic information target location information is at least one of GPS data for an established traffic information generating point, GPS data for an established location corresponding to an established distance from the traffic information generating point, and GPS data corresponding to an established area having a predetermined radius with reference to the traffic information generating point or the established location.

9. The system of claim 8, wherein
the traffic information provider includes:
a data processor for mapping the communication information on the traffic information providing digital map, and generating traffic information;
a data provider for providing the traffic information to the outside.

10. A method for providing traffic information by a system for generating and providing traffic information on a predetermined section though communication with a terminal installed in a traveling object, the method comprising:
a) the system receiving traffic information target location information from the terminal, the traffic information target location information including at least one of a coordinate, a time, a node type and an order of nodes;
b) the system matching the traffic information target location information on unit node map information of a traffic information collecting digital map;
c) generating communication information on a predetermined section with reference to a unit node based on the map matching result; and
d) the system generating traffic information by mapping the communication information on a traffic information providing digital map, and providing the traffic information,
wherein the step of c) further includes:
determining whether the map matching result information has an expressway rest area section; and
generating communication information excluding a traveling time and distance information on the expressway rest area section when it has the expressway rest area section.

11. A method for providing traffic information by a system for generating and providing traffic information on a predetermined section though communication with a terminal installed in a traveling object, the method comprising:
a) the system receiving traffic information target location information from the terminal, the traffic information target location information including at least one of a coordinate, a time, a node type and an order of nodes;
b) the system matching the traffic information target location information on unit node map information of a traffic information collecting digital map;
c) generating communication information on a predetermined section with reference to a unit node based on the map matching result; and
d) the system generating traffic information by mapping the communication information on a traffic information providing digital map, and providing the traffic information,
wherein the step of b) includes:
the system loading unit node map information of the traffic information collecting digital map in a memory;
searching a map matching point from the map information based on the traffic information target location information; and
mapping the location information on the searched matching point.

12. A method for providing traffic information by a system for generating and providing traffic information on a predetermined section though communication with a terminal installed in a traveling object, the method comprising:

a) the system receiving traffic information target location information from the terminal, the traffic information target location information including at least one of a coordinate, a time, a node type and an order of nodes;
b) the system matching the traffic information target location information on unit node map information of a traffic information collecting digital map;
c) generating communication information on a predetermined section with reference to a unit node based on the map matching result; and
d) the system generating traffic information by mapping the communication information on a traffic information providing digital map, and providing the traffic information, wherein the traffic information collecting digital map includes crossroads, the system includes a traffic information collecting digital map database, and the traffic information collecting digital map database installs a central node in the center of the crossroads, and the step of c) includes generating communication information from the traveling time between the central node of the crossroads and a different unit node and the distance between the central node and the different unit node.

13. The method of claim 12, wherein
the traffic information collecting digital map includes a road and a neighboring road,
the traffic information collecting digital map database generates a single lined road in which the road and a part of the neighboring road are combined together and installs a node at an entrance of the combined part of the neighboring road and a node at an exit of the combined part of the neighboring road, and
the step of c) includes generating communication information by determining passing through of a corresponding path according to the passing state of the node at the entrance and the node at the exit.

14. The method of claim 13, wherein
the traffic information collecting digital map includes a general road and an adjacent overpass or underground roadway,
the traffic information collecting digital map database generates a single line to indicate the general road and the adjacent overpass or underground roadway, and installs a node on the single line at a position corresponding to an entrance of the adjacent overpass or underground roadway.

* * * * *